US009208053B2

(12) United States Patent
Kejariwal et al.

(10) Patent No.: US 9,208,053 B2
(45) Date of Patent: *Dec. 8, 2015

(54) METHOD AND SYSTEM FOR PREDICTING PERFORMANCE OF SOFTWARE APPLICATIONS ON PROSPECTIVE HARDWARE ARCHITECTURE

(71) Applicant: Yahoo! Inc., Sunnyvale, CA (US)

(72) Inventors: Arun Kejariwal, San Jose, CA (US); Paolo D'Alberto, San Jose, CA (US); Sapan Panigrahi, Castro Valley, CA (US); Rosario Cammarota, Irvine, CA (US)

(73) Assignee: Yahoo! Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/334,034

(22) Filed: Jul. 17, 2014

(65) Prior Publication Data
US 2014/0350912 A1  Nov. 27, 2014

Related U.S. Application Data

(63) Continuation of application No. 13/018,243, filed on Jan. 31, 2011, now Pat. No. 8,818,787.

(51) Int. Cl.
*G06F 9/44* (2006.01)
*G06F 9/45* (2006.01)
*G06F 11/34* (2006.01)

(52) U.S. Cl.
CPC ........ *G06F 11/3447* (2013.01); *G06F 11/3419* (2013.01); *G06F 11/3442* (2013.01); *G06F 11/3466* (2013.01); *G06F 11/3409* (2013.01); *G06F 2201/81* (2013.01); *G06F 2201/83* (2013.01); *G06F 2201/86* (2013.01); *G06F 2201/865* (2013.01); *G06F 2201/88* (2013.01)

(58) Field of Classification Search
CPC ........... G06F 11/3409; G06F 11/3466; G06F 11/3648; G06F 11/3664; G06F 11/3684; G06F 11/3688; G06F 11/368; G06F 11/3447; G06F 2201/83; G06F 2201/88; G06F 2201/865
USPC ............................ 703/22; 717/124, 125, 126
See application file for complete search history.

(56) References Cited

U.S. PATENT DOCUMENTS

| 7,415,635 B1 * | 8/2008 | Annangi | 714/38.12 |
| 2009/0276191 A1 * | 11/2009 | Bell et al. | 703/1 |
| 2011/0093204 A1 * | 4/2011 | Zucht | 702/19 |

* cited by examiner

*Primary Examiner* — Aniss Chad
*Assistant Examiner* — Andre Pierre Louis
(74) *Attorney, Agent, or Firm* — Mauriel Kapouytian Woods LLP; Lana Akopyan; James Woods

(57) ABSTRACT

A system and method for identifying optimal system architectures for a reference application are provided. The system and method comprise executing a reference application and a plurality of test applications on a current system architecture and sampling performance data for each of the applications. The performance data is used to compute an application signature for each application. A similarity element is derived from the application signatures that illustrates the similarity between each application and every other application. Using a similarity threshold and an algorithm, a subset of test applications that are similar to the reference application are derived.

20 Claims, 11 Drawing Sheets

|  | Test Application A | Test Application B | Test Application C | Test Application D | Test Application E | Reference Application X |
|---|---|---|---|---|---|---|
| Test Application A | 1 |  |  |  |  |  |
| Test Application B | 0.2 | 1 |  |  |  |  |
| Test Application C | 0.1 | 0.6 | 1 |  |  |  |
| Test Application D | 0.3 | -0.4 | -0.3 | 1 |  |  |
| Test Application E | 0.5 | 0.5 | -0.1 | 0.4 | 1 |  |
| Reference Application X | -0.7 | 0.3 | 0.8 | -0.6 | 0.2 | 1 |

FIG. 7

METHOD AND SYSTEM FOR PREDICTING PERFORMANCE OF SOFTWARE APPLICATIONS ON PROSPECTIVE HARDWARE ARCHITECTURE

CROSS-REFERENCE TO RELATED APPLICATION

This application is a continuation of application Ser. No. 13/018,243, filed on Jan. 31, 2011 now U.S. Pat. No. 8,818,787.

FIELD OF THE INVENTION

The present invention relates to a method and system for predicting performance of computing architectures with respect to particular applications. More particularly, the present invention relates to a unique procedure and system for identifying test applications whose performance is similar to a reference application so as to select new hardware for testing the reference application.

BACKGROUND

Over the past three decades, computing, especially online computing, has proliferated to the point of ubiquity. Whereas computing and computer systems were initially common only in enterprise settings, most individuals and families today own and regularly use a networked computing device of some type. The emergence of the Internet has redefined the traditional paradigm of computing, shifting the locus of most computing tasks from non-networked mainframes or personal computers serving a limited number of users to networked server appliances that serve potentially millions of users a day. In particular, the recent phenomenon of cloud computing has given rise to online portals and applications that run on server architectures and are used to provide specialized online services to millions of end users. One such portal, Yahoo.com, provides dozens of applications performing a variety of different functions, such as Yahoo! Mail, Yahoo! Finance, Yahoo! Games, and Yahoo! Messenger. Although system architectures are generalized to enable processing of a variety of different tasks, each architecture has strengths and weaknesses, and one architecture may be better suited to running a particular type of application than another. In order to provide a satisfactory user experience, application providers must ensure that each online applications is run on an architecture that is suited to its particular processing needs and thus yields optimal performance. Consequently, the decision on which architecture should be used to run a particular application is a critical one for application providers.

SUMMARY OF INVENTION

The present invention introduces a method and system for determining an optimal hardware architecture for a reference application.

According to the invention, a plurality of applications is executed on a current hardware architecture. The applications comprise the reference application and a plurality of test applications. Data illustrating the performance of the applications on the current hardware architecture is collected, and a plurality of application signatures corresponding to each application is computed using the performance data. A similarity element illustrating the degrees of similarity between the applications based on their application signatures is computed using the application signatures. In one embodiment, the degrees of similarity between the applications may be computed using a Spearman's correlation. In another embodiment, the similarity element may be a matrix. Finally, a subset of test applications that are similar to the reference application based on performance is derived, so as to select a plurality of hardware architectures, for testing the reference application, on which improved performance has been reported for the subset of test applications.

In one series of embodiments, collecting performance data may entail sampling performance information at degradation events using a performance indicator, a degradation event type, a plurality of hardware counters, and a time series. The degradation event may be a resource stall or a cache miss. The performance indicator may be modeled as cycles per instruction (CPI), latency per query, or throughput. In one embodiment, the application signatures may correspond to degrees of correlation between the performance indicator and the degradation event type for each application. In another embodiment, the application signatures may comprise a plurality of vectors with a dimension corresponding to a number of hardware counters, the values of which may be ranked in ascending or descending order. The degrees of correlation between the performance indicator and the degradation event type may be computed using a Pearson's correlation.

In another series of embodiments, the subset of test applications that are similar to the reference application may be derived by modeling the similarity element as a cluster of nodes corresponding to each of the applications. In this embodiment, the cluster of nodes is partitioned using a Minimum Spanning Tree algorithm, and a sub-cluster containing a node corresponding to the reference application is selected.

BRIEF DESCRIPTION OF THE DRAWINGS

FIG. 7 depicts a table illustrating a similarity element according to an embodiment of the present invention.

DETAILED DESCRIPTION

Figure 1:
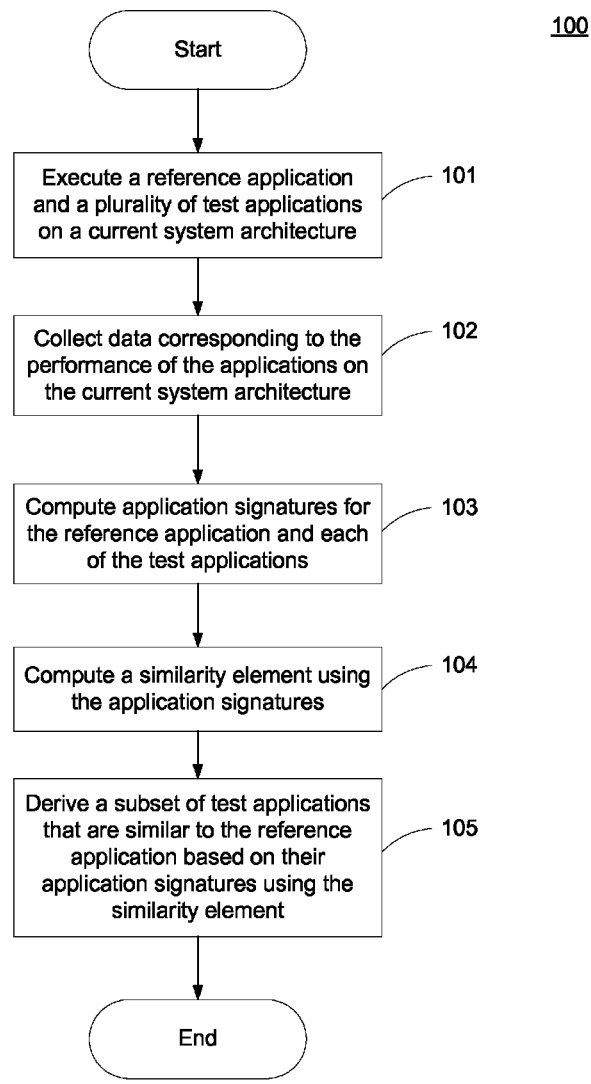
FIG. 1 depicts a flow diagram illustrating the operation of the invention according to an embodiment.

The quality of the user experience associated with a particular online application is heavily dependent on its performance. If the users of an online application perceive the application to be slow due to lengthy processing times, they will abandon it in favor of a competing solution. Thus, application service providers and online portals that derive their revenue from subscriptions or advertising have an interest in ensuring optimal performance of their online applications. By minimizing response time and maximizing throughput, an online portal can provide a positive user experience and thereby help ensure continued user loyalty.

Among the factors that affect the performance of an online application over which an application provider has the most direct control is system architecture. There are numerous central processing unit (CPU) architectures designed for use in servers, workstations, and other high-workload computer systems, such as the Xeon™ series of processors by Intel and the Opteron™ series of processors by AMD. Different CPU's may be well suited to different types of applications; use of a particular CPU may result in optimal performance of one application but sub-optimal performance of a different application. Similarly, even CPUs that have comparable specifications can often perform significantly differently while running the same application. Thus, a system administrator cannot expect optimal performance by running each application on the same architecture. Furthermore, in selecting the appropriate system configuration for a particular application, the system administrator cannot rely on the advertised specifications alone.

Typically, more detailed information on the performance of a CPU is provided by hardware manufacturers in the form of standardized benchmarks. Benchmarking is the act of running a known computer program or process on a computer system in order to measure the performance of a component of that system, usually the CPU. To ensure consistency across computer platforms and processor types, benchmarking is typically governed by standards regimes that provide industry-wide tools and guidelines on how benchmarks should be executed and measured. Standards-setting organizations provide test programs, which are collectively known as benchmark suites, and rules for how the performance of each test program should be measured. Hardware manufacturers are expected—if not required by licensing agreements, accreditation organizations, or government regulatory schemes—to provide detailed information on how their products perform when tested with applications in the benchmark suite. For example, the Standard Performance Evaluation Corporation (SPEC), a not-for-profit consortium of computer hardware manufacturers, publishes benchmarking applications and analysis guidelines by which computer manufacturers may evaluate and report the performance of their products. A recent version of these programs and guidelines, SPEC CPU2006, is currently regarded as the industry-wide standard by which CPU performance is measured.

Although benchmarking standards aid in the evaluation of CPU architecture, they do not solve the problem of determining which architecture and system configuration is most well suited to running a particular application. Because many proprietary applications have unique or specialized processing needs, the benchmark scores of a CPU that have been measured using the test applications of a benchmark suite are minimally relevant without further data illustrating the similarity of applications in the benchmark suite to a particular proprietary application. Consequently, the only reliable technique for determining which architecture and system configuration is most well suited to running a particular application is to test the application on a variety of different systems and measure the performance of the application on each system. This is a lengthy, expensive, and labor-intensive process.

Thus, testing the performance of the application on every single available architecture is not feasible.

Usually, only a subset of prospective architectures can be feasibly procured for testing specific applications. This subset is ideally chosen with reference to precise criteria that can reliably predict a particular application's performance on a system rather than the generalized features or specifications advertised by the system manufacturer. Thus, due to the rapidly expanding variety of available architectures and system configurations as well as the increasing prevalence and sophistication of online applications, an automated technique for predicting the performance of a particular application on a variety of different architectures is urgently needed.

The present invention provides such a technique by measuring similarities in performance between a reference application and several test applications on a current system architecture. The reference application is a particular application for which a suitable new architecture is sought. The test applications are well-known (and sometimes open source) applications provided by a standards regime as part of a benchmark suite. According to one embodiment, the test applications are taken from the benchmark suite of a standard that is currently in force and for which manufactures of computer hardware are required or expected to report performance on each architecture they offer for sale. A current system architecture is a system on which the reference application is currently in production or, in the case of a newly developed application, a system put into use for the purpose of testing the reference application. Once a subset of test applications whose performance on the current system architecture is sufficiently similar to that of the reference application has been identified, hardware architectures that report enhanced performance for applications from among the similar test applications can be procured for testing.

A flow diagram 100 illustrating the operation of the present invention according to an embodiment is depicted in FIG. 1. The procedure begins at step 101 with the execution of a reference application and a plurality of test applications on a current system architecture. At step 102, data corresponding to the performance of the applications on the current system architecture is collected. At step 103, application signatures are computed for the reference application and each of the test applications. At step 104, a similarity element is computed using the application signatures. The procedure concludes at step 105, when a subset of test applications that are similar to the reference application based on their application signatures is derived using the similarity element.

Figure 2:
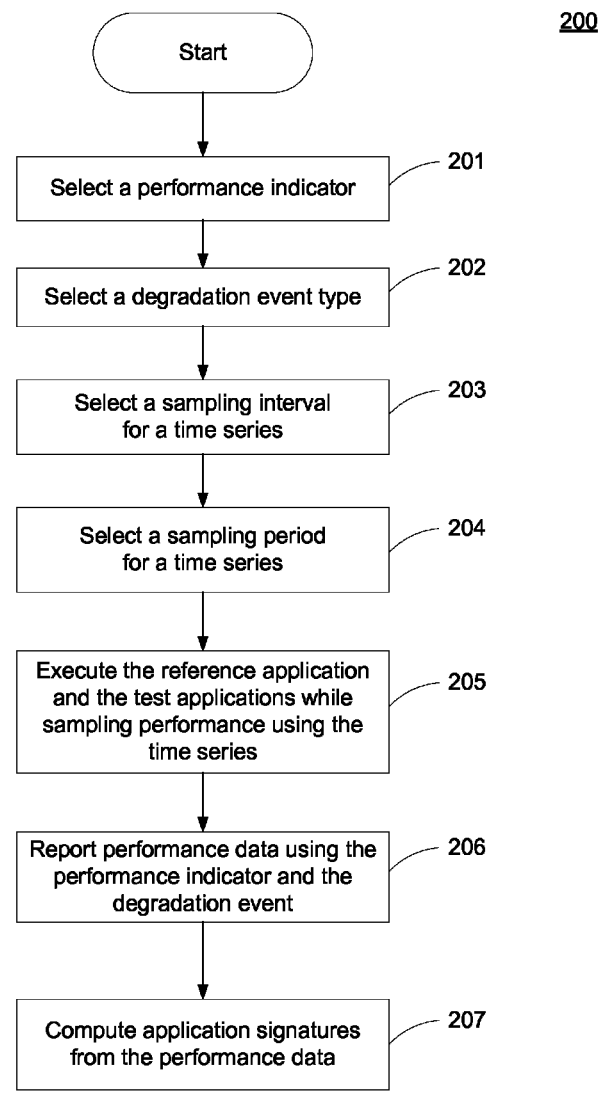
FIG. 2 depicts a flow diagram illustrating a procedure for sampling and modeling performance data according to an embodiment of the present invention.

Steps 101-103 of FIG. 1 are illustrated in further detail according to an embodiment by the flow diagram 200 depicted in FIG. 2. At step 201, a performance indicator is selected. A performance indicator is a metric by which the performance of a CPU or other system component can be measured. One common indicator of CPU performance is cycles per instruction (CPI), a measure of how many processor clock cycles occur during the execution of a single instruction. A lower CPI value denotes better performance. Other common indicators include latency per query and throughput. Any performance indicator may be used without deviating from the spirit or scope of the invention.

At step 202, a degradation event type is selected. A degradation event is an operation that affects the performance of a system component. One common type of degradation event is a resource stall. A resource stall occurs when a particular resource required by the CPU is unavailable and processing stalls to wait for the resource to become available. Another common degradation event is a cache miss. A cache miss occurs when the CPU attempts to read or write data to an onboard cache and fails, forcing the data to be retrieved from or written to memory. Accessing memory is a higher-latency operation that requires additional processing time. Any degradation event type may be used without deviating from the spirit or scope of the invention.

At steps 203 and 204, a sampling interval and a sampling period are selected, respectively, for a time series. A time series is a sequence of data points measured at a fixed time interval. In the context of hardware performance benchmarking, a time series captures the performance of a hardware component at fixed sampling intervals throughout a particular sampling period. The resulting data illustrates the overall performance of a computer system or hardware component. The time interval must be carefully chosen so as to be small enough that the data accurately represents overall performance but large enough that the process of sampling performance does not interfere with hardware operation and thus result in data that is skewed or inaccurate. The sampling period must be sufficiently lengthy to capture enough data points to be representative of the hardware performance.

Figure 3:
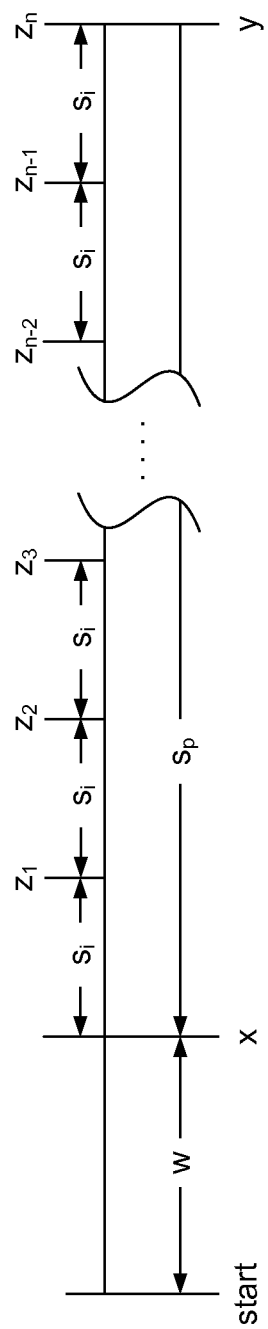
FIG. 3 depicts a diagram illustrating a time series according to an embodiment of the present invention.

A time series 300 according to an embodiment is depicted in FIG. 3. The time series 300 illustrates the various stages of the sampling process. Once sampling has begun, there is a warm up stage w during which the sampling engine completes its start up process. No sampling occurs during this stage. Sampling begins at point x and continues until point y; the length of time between point x and point y is the sampling period $s_p$. The step of sampling performance data z is performed n instances at intervals $s_i$ until the sampling period ends at y. The number of data points within the sampling period $s_p$ is given by $s_p/s_i$=n. In this series of embodiments, any time series may be used without deviating from the spirit or scope of the invention.

Returning to FIG. 2, at step 205, the reference application and test applications are executed on the current system architecture while their performance is sampled with a time series. The applications are executed successively, not concurrently, to avoid distortion of performance data. According to one series of embodiments, performance is sampled using hardware counters of the current system architecture. A hardware counter tracks instances of a degradation event type within a computer hardware system. In one such embodiment, representative data may be obtained by utilizing only a few of potentially hundreds of counters available. In this embodiment, if CPI is selected as the performance indicator and resource stalls are selected as the degradation event, the performance for each hardware counter may be modeled as:

$$CPI = CPI_{optimal} + CPI_{stalls}$$

At step 206, performance data is reported using the performance indicator and the degradation event. At step 207, application signatures are computed from the performance data for each of the reference application and the test applications.

Figure 4:
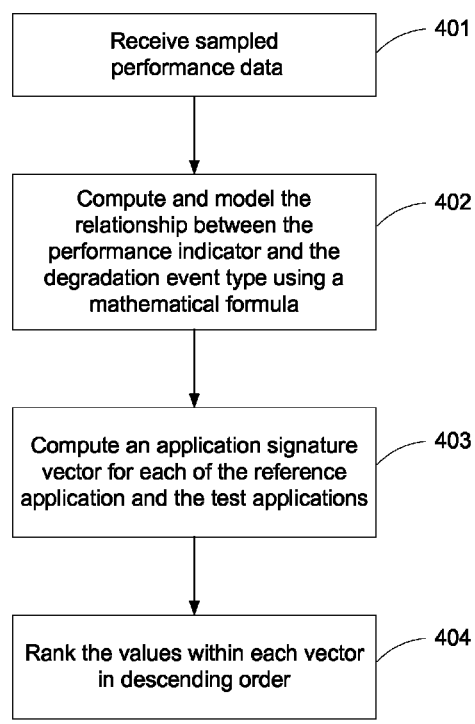
FIG. 4 depicts a flow diagram illustrating a procedure for computing application signatures according to an embodiment of the present invention.

Step 207 is illustrated in further detail according to an embodiment by the flow diagram 400 depicted in FIG. 4. At step 401, the sampled performance data is received. At step 402, the relationship between the performance indicator and the degradation event type is computed and modeled using a mathematical formula. In one embodiment, a Pearson's correlation coefficient may be used. A Pearson's correlation coefficient is a measure of the linear dependence between two variables, represented by a value between −1 and 1. At step 403, application signatures are computed for each of the reference application and the test applications. An application signature illustrates the performance of an application on the current hardware architecture. According to one series of embodiments, the application signatures may be represented as vectors. In one such embodiment, the dimension of each vector corresponds to a number of hardware counters within the current architecture used to track the performance of the applications. Each vector may comprise numerical values that represent the degree to which a degradation event affects the performance of the reference application on the current system architecture. According to this embodiment, the numerical values range from −1 to 1, wherein a −1 denotes a degradation event that has no actual effect or an unknown effect on performance and a 1 denotes a degradation event that has a strong effect on performance. Any data structure or model may be used to represent the application signatures without deviating from the scope or spirit of the invention.

At step 404, the values within each vector are ranked in descending order. Thus, the vector is rearranged such that the values representing degradation events that have the strongest effect on performance are indexed as the topmost values in the vector, whereas the values representing degradation events that have the least effect on performance are indexed as the lowermost values of the vector. The resulting ranked vectors, coupled with the original vectors that preserve the listing of which value corresponds to which hardware counter, collectively comprise the application signatures of each of the reference application and the test applications.

Figure 5:
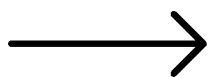
FIG. 5 depicts a diagram illustrating an application signature according to an embodiment of the present invention.

An application signature 500 modeled as unranked and ranked vectors according to the above-described series of embodiments is illustrated in FIG. 5. The vector 501 has a dimension of 5, wherein each index corresponds to one of five hardware counters used to track degradation events. The values in indexes 1 to 5 of vector 501 are 0.2, −0.3, 0.8, −0.4, and 0.5, respectively. The values in vector 501 are ranked in descending order, resulting in the ranked vector 502. Thus, the application signature 500 includes the original vector 501 and the ranked vector 502; the correlation between the ranked vector 502 and the hardware counters is represented by the listing of original indices 503 (which represent the hardware counters and corresponding degradation events) from vector 501 adjacent to vector 502. In one embodiment, applications whose ranked indices (i.e., the ranking of the hardware counters based on each respective degradation event's effect on performance) are equivalent may be considered similar, irrespective of the values within the vectors. Thus, an application with an indices ranking of 3, 5, 1, 2, 4 may be considered similar to an application with signature 500 as depicted in FIG. 5.

Figure 6:
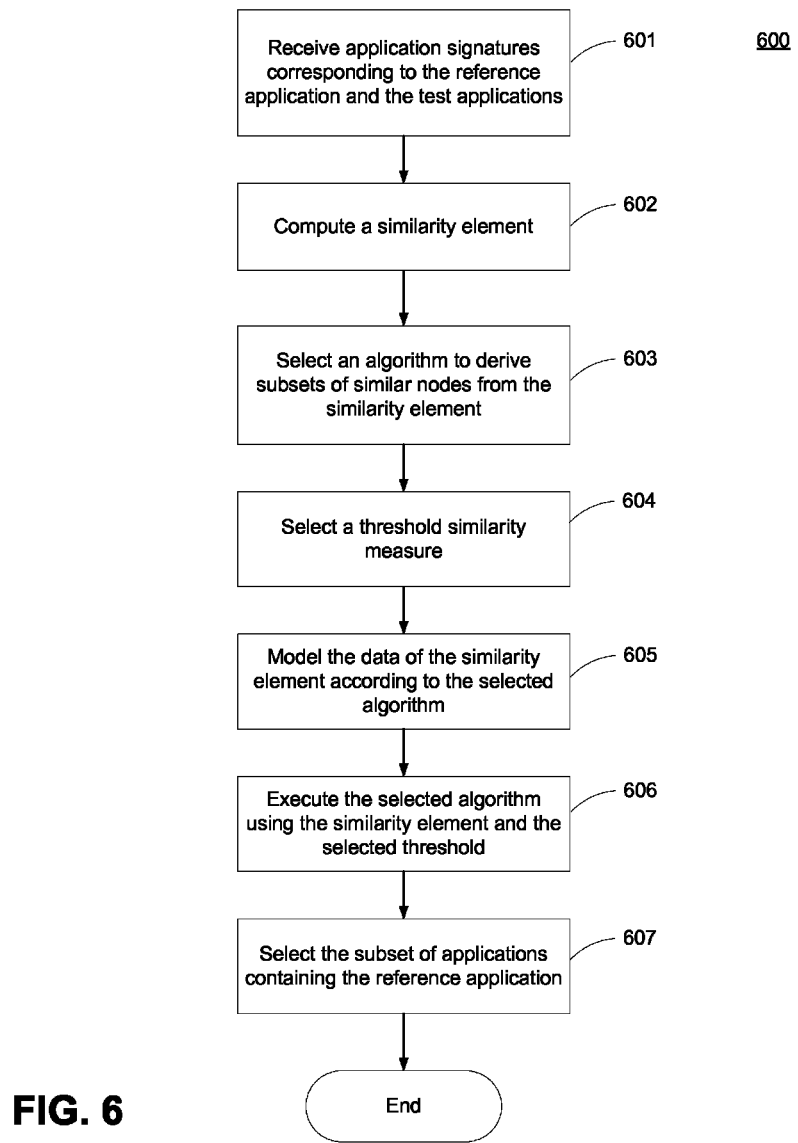
FIG. 6 depicts a flow diagram illustrating a procedure for deriving a subset of similar applications according to an embodiment of the present invention.

Steps 104 and 105 of FIG. 1 are illustrated in further detail according to an embodiment by the flowchart 600 depicted in FIG. 6. At step 601 the application signatures corresponding to the reference application and the test applications are received. At step 602, a similarity element is computed. The similarity element characterizes the degrees of similarity between the applications based on their respective application signatures. According to one series of embodiments, the similarity element is modeled as a matrix comprising values that denote the similarity of each application to every other application. In one such embodiment, the matrix is computed using a Spearman's correlation, a mathematical coefficient used to measure a monotonic relationship between two continuous random variables. Any data model or structure may be used to represent the similarity element without deviating from the scope or spirit of the invention.

A similarity matrix 700 computed according to such an embodiment is depicted in FIG. 7. Similarity matrix 700 corresponds to the similarity between Reference Application X, Test Application A, Test Application B, Test Application C, Test Application D, and Test Application E. In the embodiment illustrated in FIG. 7, values range from −1 to 1, wherein a −1 represents a pair of applications that are wholly dissimilar and a 1 represents an equivalence of two applications. Thus, Reference Application X bears a high degree of similarity to Test Application C, but almost no similarity to Test Application A.

Returning to FIG. 6, at step 603, an algorithm to derive subsets of similar applications from the similarity element is selected. According to one series of embodiments, a clustering algorithm is used. In one such embodiment, a Minimum Spanning Tree Algorithm is used as the clustering algorithm. A Minimum Spanning Tree Algorithm forms a subgraph from a weighted, undirected graph by iteratively cutting the edges of maximum weight within the graph. The weight of the resulting subgraph (i.e., the sum of the weights of its edges) must be no larger than a predetermined threshold. As implemented in the context of clustering, A Minimum Spanning Tree Algorithm forms clusters of data sets from an initial, unpartitioned collection of data. Although a Minimum Spanning Tree Algorithm has been used in the present embodiment, any algorithm may be used without deviating from the spirit or scope of the invention.

At step 604, the data of the similarity element is modeled according to the selected algorithm. In the embodiment in which a Minimum Spanning Tree Algorithm is used, all of the applications are modeled as mutually interconnected nodes wherein the weights of the edges between each pair of nodes are inversely proportional to the degrees of similarity between each corresponding pair of applications, as indicated by the similarity element. In this embodiment, each node and the weighted edges connecting it to every other node is modeled as a sub-cluster within the initial cluster of mutually interconnected nodes. At step 605, the selected algorithm is executed using the remodeled data of the similarity element. In the embodiment in which a Minimum Spanning Tree Algorithm is used, the initial cluster of applications is iteratively partitioned by successively cutting the edges of maximum weight within a sub-cluster until only one edge remains. The remaining edge is traversed, and the sub-cluster of its corresponding node is used for the next iteration. The weight of the remaining edge is held as the maximum weight threshold for the next iteration. The Minimum Spanning Tree Algorithm terminates when a sub-cluster contains no edges with a weight smaller than the maximum weight threshold, resulting in every other edge being cut. Finally, at step 607, the subset of applications containing the reference application is selected.

Figure 8A:
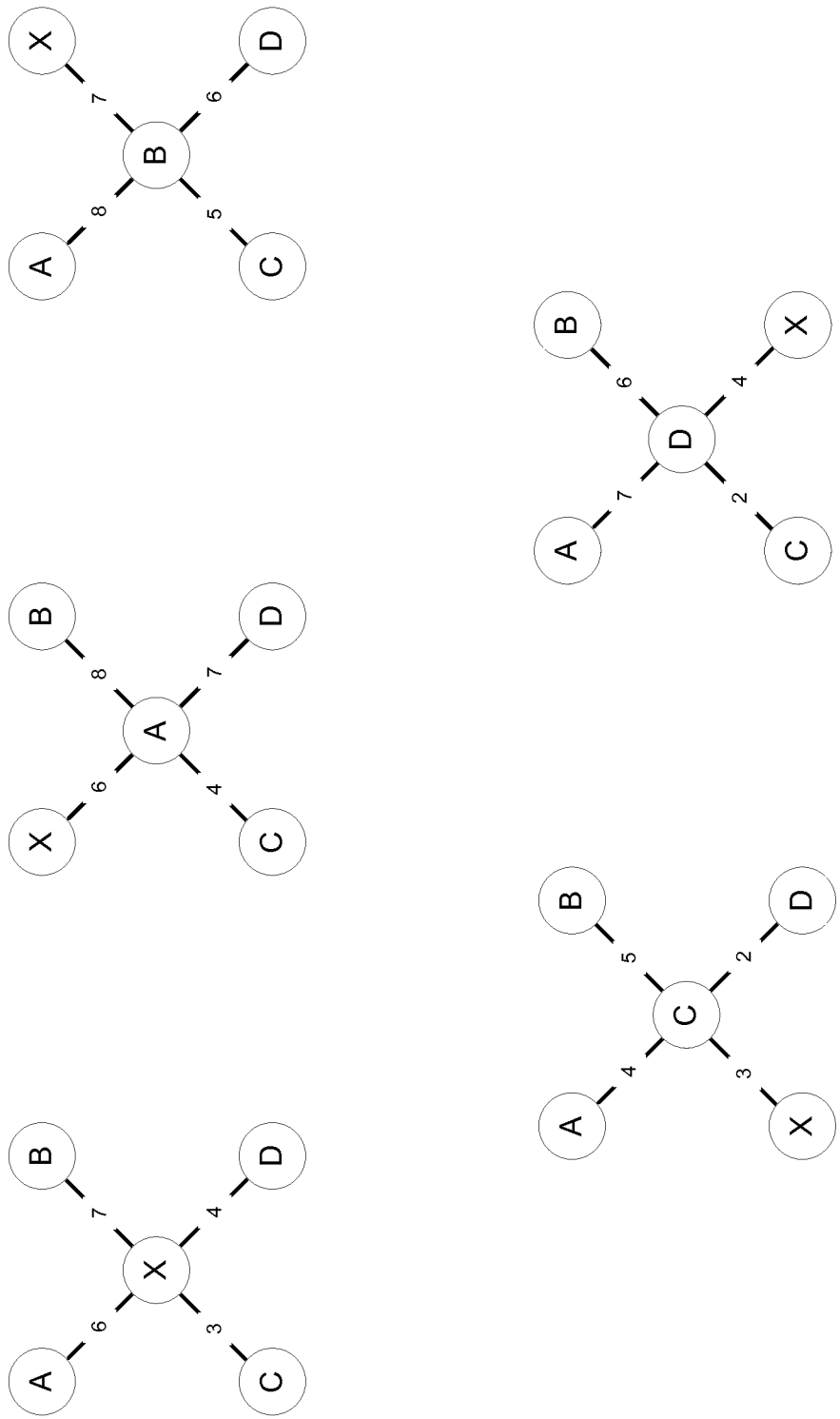
FIGS. 8A-8C depict the operations of a Minimum Spanning Tree Algorithm according to an embodiment of the present invention.
Figure 8B:
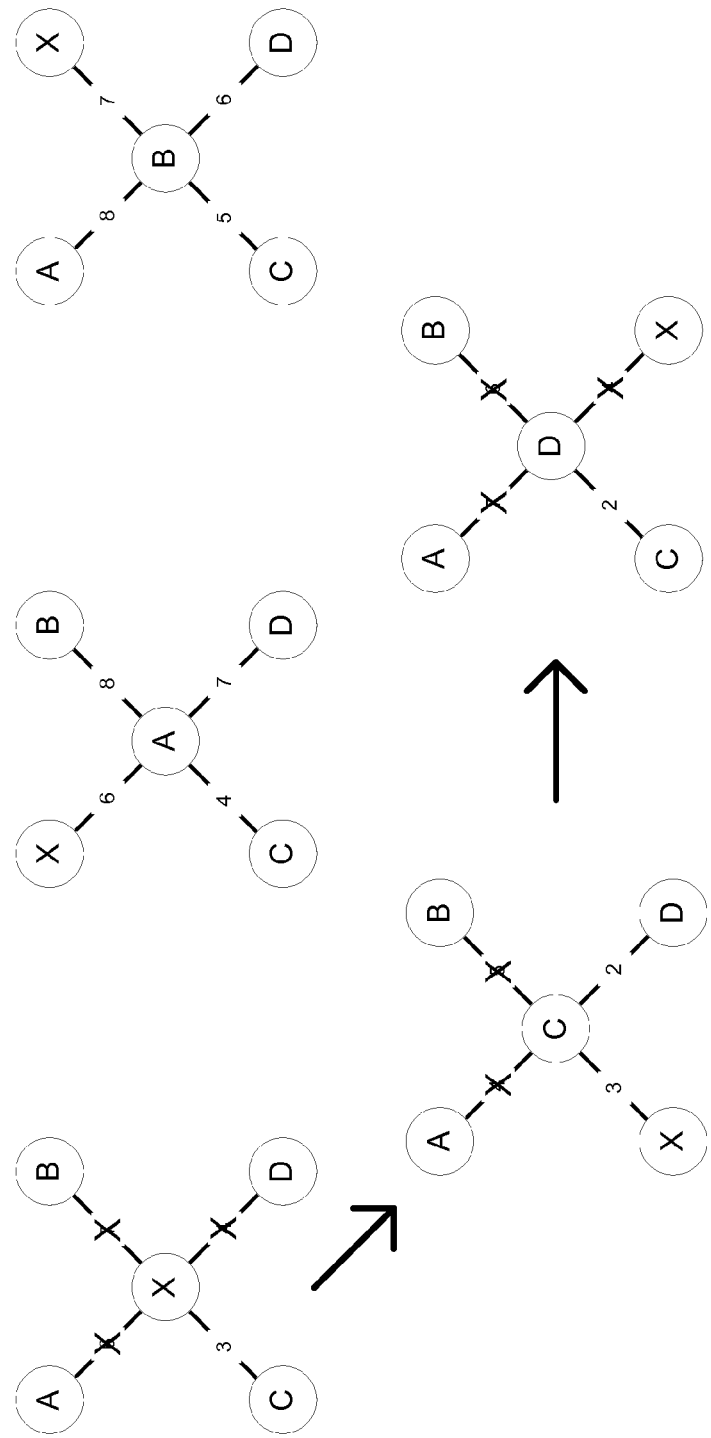
Figure 8C:
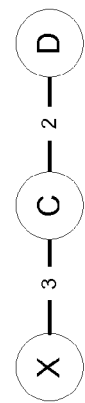
Figure 9:
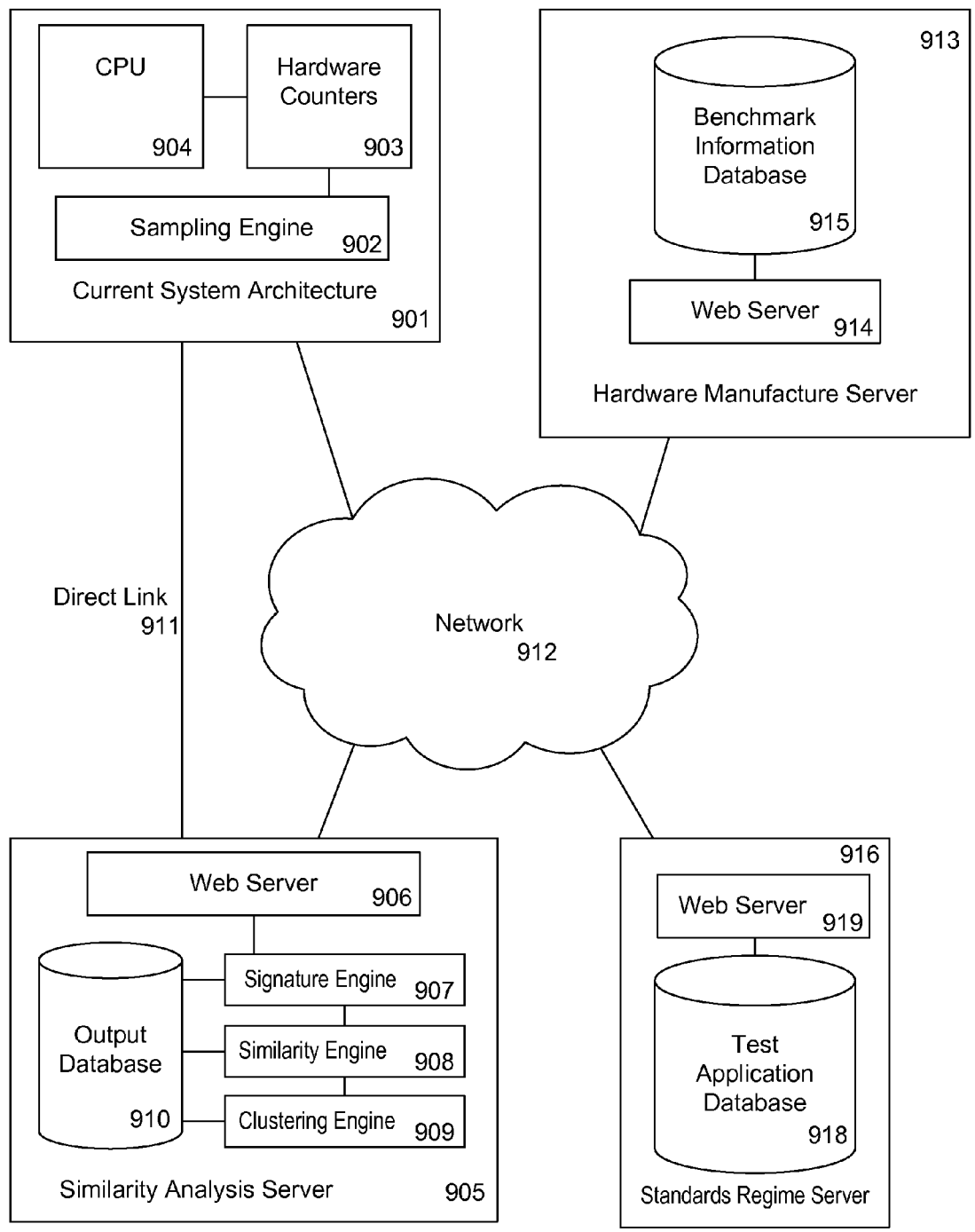
FIG. 9 depicts a diagram illustrating an exemplary environment for the operation of the methods and systems comprising the present invention according to an embodiment.

The embodiment described above in which a Minimum Spanning Tree Algorithm is used is illustrated in further detail by FIGS. 8A, 8B, and 8C. The illustrated example includes a Reference Application X and Test Applications A, B, C, and D. These are modeled as nodes X, A, B, C, and D, respectively. In FIG. 8A, Each application sub-cluster is illustrated as a node along with its weighted edges connecting it with every other node. The numbers listed between nodes correspond to the weights of the edges connecting two nodes. Although the sub-clusters are modeled as mutually connected within an initial cluster, they are depicted in FIGS. 8A and 8B as separate sub-clusters for ease of illustration. As depicted in FIG. 8B, the algorithm begins with the sub-cluster corresponding to Reference Application X. Of the four edges, the three whose weights are the greatest are cut, leaving only the edge joining X with C. This edge is traversed, and the algorithm proceeds to the sub-cluster corresponding to Test Application C for its next iteration. In this sub-cluster, the weight of the traversed edge, 3, is held as a threshold. All edges with weights exceeding the threshold are cut, leaving only the edge joining C with D. This edge is traversed, and the algorithm proceeds to the sub-cluster corresponding to Test Application D for the next iteration. In this sub-cluster, the weight of the traversed edge, 2, is held as a threshold. All edges with weights exceeding the threshold are cut, leaving no remaining edges. The algorithm then terminates, resulting in the subgraph X-C-D as illustrated in FIG. 8C. Thus, in this example, the subset of applications similar to Reference Application X consists of Test Applications C and D.

According to any of the above-described series of embodiments, the performance of the test applications within the selected subset is similar to that of the reference application. Because hardware manufacturers provide performance data for each of the test applications on available hardware systems, the similar test applications may be used as a guide for selecting new hardware systems for testing the reference application. If there is a significant improvement between the performance of these similar test applications on the current system architecture and the performance of the similar test applications on a new system architecture according to the benchmark information provided by the hardware manufacturer, than the new system architecture may be a good candidate to procure for testing.

A diagram 900 illustrating an exemplary computing environment for the execution of the techniques comprising the present invention according to an embodiment is depicted in FIG. 900. The components of diagram 900 may be implemented using hardware or software modules. The diagram 900 depicts a Current System Architecture 901, which includes a Sampling Engine 902, Hardware Counters 903, and a CPU 904. The Current System Architecture receives a reference application from Similarity Analysis Server 905 via a Direct Link 911 and a plurality of test applications from a Standards Regime Server via a Network 912. The instructions comprising the reference application and the test applications are executed by the CPU 904 as described above in relation to step 101 of FIG. 1 and step 205 of FIG. 2. As the reference application and the test applications are being executed by the CPU 904, the sampling engine 902, in conjunction with the hardware counters 903, samples the performance of the reference application and the test applications as described above in relation to step 102 of FIG. 1 and step 205 of FIG. 2.

The diagram 900 further depicts a Similarity Analysis Server 905, which includes a Web Server 906, a Signature Engine 907, a Similarity Engine 908, a Clustering Engine 909, and an Output Database 910. The Similarity Analysis Server 905 receives sampled performance data from the Current System Architecture 901 as described in relation to step 401 of FIG. 4. The sampled performance data is processed by the Signature Engine 907 and converted to application signatures as described above in relation to step 207 of FIG. 2 and steps 402-404 of FIG. 4. The application signatures are processed by the Similarity Engine 908, resulting in a similarity element as described above in relation to step 104 of FIG. 1 and step 602 of FIG. 6. The similarity element is processed by the Clustering Engine 909, resulting in a subset of applications containing the reference application and similar test applications as described above in relation to step 105 of FIG. 1 and steps 603-607 of FIG. 6. The output of each of the Signature Engine 907, the Similarity Engine 908, and the Clustering Engine 909 is stored in the Output Database 910.

The diagram 900 further includes a Hardware Manufacturer Server 913 and a Standards Regime Server 916. The Hardware Manufacturer Server 913 includes a Benchmark Information Database 915 and the Standards Regime Server 916 includes a Test Applications Database 918. The Hardware Manufacturer Server 913 and the Standards Regime Server 916 both include a Web Server 914 and 919, respectively. The Web Server 919 of the Standards Regime Server 916 receives a request for a suite of test applications via a Network 912 from a Current System Architecture 901 and/or the Similarity Analysis Server 905. The Web Server 916 retrieves the requested test applications and transmits them via the Network 912. The Web Server 914 of the Hardware Manufacturer Server 913 receives a request for hardware benchmark information via the Network 912 from a Similarity Analysis Server 905. The Web Server 919 retrieves the requested hardware benchmark information from the Benchmark Information Database 915 and transmits it via the Network 912.

Communications between and among the Current System Architecture 901, the Similarity Analysis Server 905, the Hardware Manufacturer Server 913, and the Standards Regime Server 916 may occur via the Network 912. The Network 912 may comprise any combination of networks including, without limitation, the web (i.e. the Internet), a local area network, a wide area network, a wireless network, a cellular network, etc. Communications between the Current System Architecture 901 and the Similarity Analysis Server 905 may occur via Direct Link 911. Direct Link 911 may comprise a fiber-optic line, an ethernet connection, a closed wireless network, an intranet, or any other type of shielded, private connection between two nodes.

Figure 10:
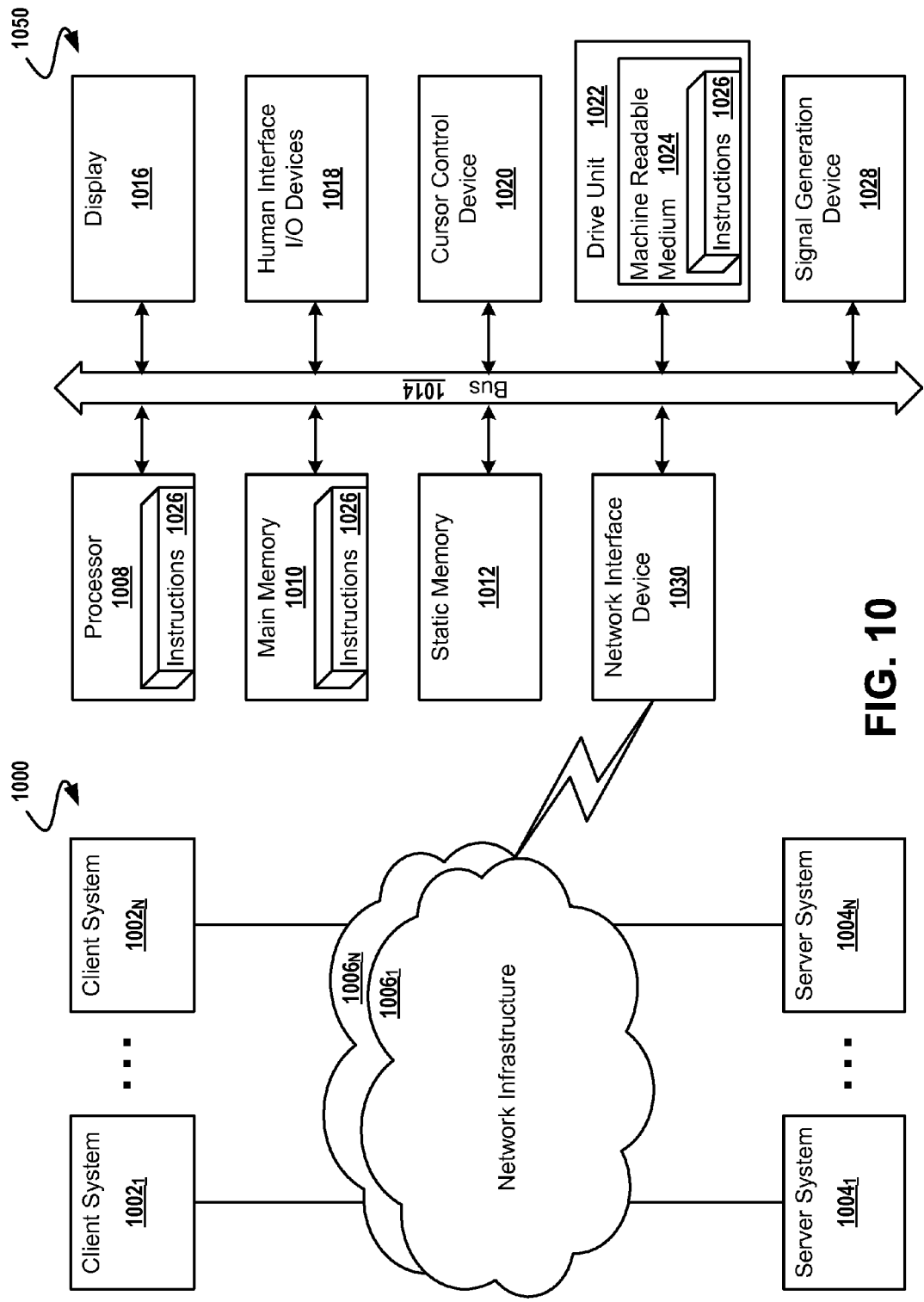
FIG. 10 depicts a diagram illustrating an exemplary hardware implementation for the operation of the methods and systems comprising the present invention according to an embodiment.

FIG. 10 is a diagrammatic representation of a network 1000, including nodes for client computer systems $1002_1$ through $1002_N$, nodes for server computer systems $1004_1$ through $1004_N$, nodes for network infrastructure $1006_1$ through $1006_N$, any of which nodes may comprise a machine 1050 within which a set of instructions for causing the machine to perform any one of the techniques discussed above may be executed. The embodiment shown is purely exemplary, and might be implemented in the context of one or more of the figures herein.

Any node of the network 1000 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system 1050 includes a processor 1008 (e.g. a processor core, a microprocessor, a computing device, etc), a main memory 1010 and a static memory 1012, which communicate with each other via a bus 1014. The machine 1050 may further include a display unit 1016 that may comprise a touch-screen, or a liquid crystal display (LCD), or a light emitting diode (LED) display, or a cathode ray tube (CRT). As shown, the computer system 1050 also includes a human input/output (I/O) device 1018 (e.g. a keyboard, an alphanumeric keypad, etc), a pointing device 1020 (e.g. a mouse, a touch screen, etc), a drive unit 1022 (e.g. a disk drive unit, a CD/DVD drive, a tangible computer readable removable media drive, an SSD storage device, etc), a signal generation device 1028 (e.g. a speaker, an audio output, etc), and a network interface device 1030 (e.g. an Ethernet interface, a wired network interface, a wireless network interface, a propagated signal interface, etc).

The drive unit 1022 includes a machine-readable medium 1024 on which is stored a set of instructions (i.e. software, firmware, middleware, etc) 1026 embodying any one, or all, of the methodologies described above. The set of instructions 1026 is also shown to reside, completely or at least partially, within the main memory 1010 and/or within the processor 1008. The set of instructions 1026 may further be transmitted or received via the network interface device 1030 over the network bus 1014.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing information in a form readable by a machine (e.g. a computer). For example, a machine-readable medium includes read-only memory (ROM); random access memory (RAM); magnetic disk storage media; optical storage media; flash memory devices; electrical, optical or acoustical or any other type of media suitable for storing information.

The invention claimed is:

1. A computer implemented method for determining an optimal hardware architecture for a reference application, the method comprising:

collecting performance data, sampled at degradation events and corresponding to performance of executing applications on a current hardware architecture, the executing applications including the reference application and a plurality of test applications, wherein collecting performance data comprises sampling performance information at degradation events using a performance indicator, a degradation event type, and a plurality of hardware counters;

computing a similarity between the executing applications based on their application signatures and using the performance data; and deriving, in a computer, using the computed similarity, a subset of test applications that are similar to the reference application based on performance, so as to select a plurality of hardware architectures, for testing the reference application, on which improved performance has been reported for the subset of test applications.

2. The computer implemented method of claim 1, wherein performance data is sampled using a time series.

3. The computer method of claim 1, wherein the application signatures correspond to degrees of correlation between the performance indicator and the degradation event type for each application.

4. The method of claim 1, wherein the application signatures comprise a plurality of vectors with a dimension corresponding to a number of hardware counters.

5. The method of claim 4, further comprising ranking a plurality of values within each of the vectors.

6. The method of claim 1, wherein the computed similarity includes a matrix.

7. The computer implemented method of claim 1 wherein deriving a subset of test applications that are similar to the reference application based on performance comprises:
modeling, using a computer, the computed similarity as a cluster of nodes corresponding to the applications;
partitioning, using a computer, the cluster of nodes using a Minimum Spanning Tree algorithm; and
selecting, using a computer, a sub-cluster containing a node corresponding to the reference application.

8. The computer implemented method of claim 1, wherein the degradation event type corresponds to at least one of resource stalls and cache misses and the performance indicator corresponds to at least one of cycles per instruction (CPI), latency per query, and throughput.

9. The computer implemented method of claim 3, wherein the degrees of correlation between the performance indicator and the degradation event type are computed using a Pearson's correlation.

10. The computer implemented method of claim 1, wherein the computed similarity between the executing applications is computed using a Spearman's correlation.

11. A non-transitory computer readable medium comprising a set of instructions which, when executed by a computer, cause the computer to execute steps for determining an optimal hardware architecture for a reference application, the steps comprising:
collecting, with a computer, performance data sampled at degradation events and corresponding to performance of executing applications on a current hardware architecture, the executing applications including the reference application and a plurality of test applications, wherein collecting performance data comprises sampling performance information at degradation events using a performance indicator, a degradation event type, and a plurality of hardware counters;
computing a similarity element between the executing applications based on their application signatures and using the performance data; and
deriving, in a computer, using the computed similarity, a subset of test applications that are similar to the reference application based on performance, so as to select a plurality of hardware architectures, for testing the reference application, on which improved performance has been reported for the subset of test applications.

12. The computer readable medium of claim 11, wherein performance data is sampled using a time series.

13. The computer readable medium of claim 11, wherein the application signatures correspond to degrees of correlation between the performance indicator and the degradation event type for each application.

14. The computer readable medium of claim 11, wherein the application signatures comprise a plurality of vectors with a dimension corresponding to a number of hardware counters.

15. The computer readable medium of claim 14, the steps further comprising ranking a plurality of values within each of the vectors.

16. The computer readable medium of claim 11, wherein the computed similarity includes a matrix.

17. The computer readable medium of claim 11 wherein deriving a subset of test applications that are similar to the reference application based on performance comprises:
modeling, using a computer, the computed similarity as a cluster of nodes corresponding to the applications;
partitioning, using a computer, the cluster of nodes using a Minimum Spanning Tree algorithm; and
selecting, using a computer, a sub-cluster containing a node corresponding to the reference application.

18. The computer readable medium of claim 12, wherein the degradation event type corresponds to at least one of resource stalls and cache misses and the performance indicator corresponds to at least one of cycles per instruction (CPI), latency per query, and throughput.

19. The computer readable medium of claim 13, wherein the degrees of correlation between the performance indicator and the degradation event type are computed using a Pearson's correlation.

20. The computer readable medium of claim 11, wherein the computed similarity between the executing applications is computed using a Spearman's correlation.

* * * * *